(12) United States Patent
Bousset et al.

(10) Patent No.: US 9,457,771 B2
(45) Date of Patent: Oct. 4, 2016

(54) LIQUID SPRAYING DEVICE FOR A WIPER BLADE

(75) Inventors: Xavier Bousset, Mezel (FR); Grégory Kolanowski, Siaugues-Saint-Romain (FR); Gérald Caillot, Cernay la Ville (FR)

(73) Assignee: Valeo Sysèmes d'Essuyage, Le Mesnil Saint Denis (FR)

( * ) Notice: Subject to any disclaimer, the term of this patent is extended or adjusted under 35 U.S.C. 154(b) by 90 days.

(21) Appl. No.: 14/117,469

(22) PCT Filed: Apr. 17, 2012

(86) PCT No.: PCT/EP2012/056972
§ 371 (c)(1),
(2), (4) Date: Feb. 4, 2014

(87) PCT Pub. No.: WO2012/156164
PCT Pub. Date: Nov. 22, 2012

(65) Prior Publication Data
US 2014/0224901 A1    Aug. 14, 2014

(30) Foreign Application Priority Data

May 13, 2011 (FR) ...................... 11 54184

(51) Int. Cl.
*B60S 1/52* (2006.01)
*B60S 1/38* (2006.01)

(52) U.S. Cl.
CPC .............. *B60S 1/522* (2013.01); *B60S 1/3894* (2013.01); *B60S 1/524* (2013.01); *B60S 1/3889* (2013.01)

(58) Field of Classification Search
CPC ....... B60S 1/46–1/528; B60S 1/3887–1/3894; B60S 1/3886; B60S 1/3896
USPC .............. 239/284.1, 600; 15/250.01, 250.02, 15/250.04
See application file for complete search history.

(56) References Cited

U.S. PATENT DOCUMENTS

| | | | | |
|---|---|---|---|---|
| 3,793,670 A | * | 2/1974 | Riester et al. ............. | 15/250.04 |
| 3,940,068 A | * | 2/1976 | Mohnach et al. ......... | 239/284.1 |
| 2009/0172907 A1 | * | 7/2009 | Egner-Walter et al. ... | 15/250.01 |
| 2010/0319154 A1 | * | 12/2010 | Bousset ..................... | 15/250.48 |
| 2011/0016653 A1 | * | 1/2011 | Caillot et al. .............. | 15/250.01 |

FOREIGN PATENT DOCUMENTS

| | | | | |
|---|---|---|---|---|
| DE | 10 2009 017990 A1 | 10/2010 | | |
| EP | 1 918 167 A1 | 5/2008 | | |
| EP | 1918167 A1 | * 5/2008 | ............... | B60S 1/38 |
| FR | 2 916 716 A1 | 12/2008 | | |
| FR | 2 933 933 A1 | 1/2010 | | |
| WO | 2008/148614 A1 | 12/2008 | | |
| WO | WO 2008148614 A1 | * 12/2008 | ............... | B60S 1/52 |
| WO | WO 2010121729 A2 | * 10/2010 | ............... | B60S 1/52 |
| WO | 2011/061461 A2 | 5/2011 | | |

OTHER PUBLICATIONS

Office Action in corresponding Chinese application No. 201280034596.6 dated Oct. 23, 2015 (18 pages).
International Search Report for corresponding International Application No. PCT/EP2012/056972, mailed Jul. 3, 2012 (6 pages).
Written Opinion for corresponding International Application No. PCT/EP2012/056972, mailed Jul. 3, 2012 (10 pages).

* cited by examiner

*Primary Examiner* — Len Tran
*Assistant Examiner* — Cody Lieuwen
(74) *Attorney, Agent, or Firm* — Osha Liang LLP

(57) ABSTRACT

A liquid projection device intended to be mounted on an end-piece that can be attached to a longitudinal end of a wiper blade includes a body and a liquid flow channel made as a single unit. The channel includes an inlet opening and a spraying opening, and the body includes an inner wall that defines a recess for receiving the end piece.

14 Claims, 3 Drawing Sheets

LIQUID SPRAYING DEVICE FOR A WIPER BLADE

The field of the present invention is that of equipment for vehicles, and more particularly that of equipment for wiping the windows of motor vehicles.

Motor vehicles are commonly equipped with windshield wiper systems for washing the windshield and avoiding disruption to the driver's view of his surroundings. These windshield wipers are conventionally driven by an arm that carries out an angular to-and-fro movement and have elongate wipers which themselves carry squeegee blades made of a resilient material. These blades rub against the windshield and evacuate the water by removing it from the driver's field of view. The wipers are produced in the form either, in a conventional version, of articulated yokes which hold the squeegee blade at a number of discrete locations or, in a more recent version, known as the "flat blade" version, of a semi-rigid assembly which holds the squeegee blade along its entire length. In this second solution, the wiper is attached to the turning arm of the windshield wiper by an assembly consisting of a mechanical connector and an adaptor. The mechanical connector is a piece which is crimped directly onto the flat blade, while the adaptor is an intermediate piece which allows the connector to be fastened to the arm of the windshield wiper. These two pieces are connected to one another by a transverse pin that allows their relative rotation in a plane perpendicular to the windshield passing through the arm.

Windshield wipers are also equipped with devices for feeding a windshield washer liquid which is fed from a tank installed on the vehicle and which is sprayed in the direction of the windshield by nozzles located either around the windshield or on the windshield wiper itself, as is the case with the device disclosed in the document WO2008/148614A1.

The spraying device disclosed in said document is carried by an end fitting which is itself fastened to a wiper frame. However, the way in which the spraying device is arranged is not detailed, and no industrial-scale solution meeting the economic requirements of the automotive sector is shown in said document.

The aim of the present invention is thus to solve the drawback described above, mainly by proposing a technical solution for spraying a liquid onto a window of a motor vehicle, this being realizable from an industrial point of view. In other words, the solution covered by the invention is both reliable and viable from an economic point of view, making it suitable for use in the automotive sector. Similarly, the design of the spraying device according to the invention makes its mounting on a wiper compatible with the requirements of motor vehicle manufacturers. Finally, such a spraying device can be retrofitted easily since it requires no adjustment of the length of a component of the wiper.

The subject of the invention is thus a device for spraying a liquid, intended to be mounted on an end fitting able to be attached to a longitudinal end of a wiper, comprising a body and a circulation channel for the liquid that are produced in one piece, said channel comprising an inlet orifice and a spraying orifice, wherein, in said spraying device, the body comprises an internal wall which delimits a housing intended to receive the end fitting. It will be understood here that the housing is intended to be fitted on the end fitting and to cover the latter.

According to one aspect of the invention, the housing comprises three openings which extend respectively through a first side bordering the body, through a second side bordering the body and separate from the first side and through a third side connecting the first side to the second side such that the housing is able to be fitted on the end fitting. The first side is, in particular, opposite the second side with respect to the housing. The housing thus passes right through the body of the spraying device.

According to another aspect of the invention, the body comprises a first portion connected to a second portion connected in turn to a third portion, said portions of said body extending in different planes and being able to match the contour of an external wall of the end fitting. It will be understood here that the three portions of the body are able to partially encompass the end fitting, that is to say that they are intended to cover the end fitting. The housing is thus delimited by its three openings in the three portions of the body.

According to one embodiment, the internal wall of the body comprises a first face having a concave shape connected to a second face having a convex shape, itself connected to a third face having a concave shape, connected in turn to a fourth face having a convex shape, connected finally to a fifth face having a concave shape, said faces being able to match the contour of an external wall of the end fitting. In the same way as set out in the previous paragraph, it will be understood here that the faces of the internal wall are able to partially encompass the end fitting, that is to say that they are intended to cover the end fitting along at least a part of its length. The housing is thus delimited in this case by its three openings and the five faces of the internal wall.

The spraying device extends in a first direction known as a "longitudinal" direction in that it extends parallel to the longitudinal direction of the wiper. Similarly, the channel extends in a second longitudinal direction, the latter being parallel to the first longitudinal direction. This ensures that an area of the window that is as close as possible to the wiper blade is sprayed.

According to another exemplary embodiment of the invention, the spraying device extends in the first longitudinal direction and comprises at least one fastening means able to immobilize the spraying device with respect to the end fitting in a direction parallel to the first longitudinal direction. Advantageously, the fastening means comprises at least one lug.

According to a variant of the invention, at least one of the lugs, called the first lug, originates in the region of the concave first face of the internal wall of the body and at least one of the lugs, called the second lug, originates in the region of the concave fifth face of the internal wall of the body.

Advantageously, the lug or lugs extend(s) toward the interior of the housing. In other words, the lug or lugs extend(s) toward an interior volume delimited by the body of the spraying device.

According to one exemplary embodiment, the spraying orifice is in the form of a hole made in a surface molded together with the circulation channel. It will be understood here that the channel is plugged at its end that carries the spraying orifice by the same material, molded together with the material for producing the channel.

Alternatively, the spraying orifice is realized by a perforated ball attached to an open end of the channel. Such a ball is held in the channel but has a degree of freedom in rotation with respect to this channel.

According to one aspect of the invention, the liquid circulation channel is connected to the body by at least one arm which originates on an external wall of the body.

The invention also relates to an assembly comprising an end fitting able to be installed at a longitudinal end of a wiper and a device for spraying a liquid, as defined above, for a wiper.

According to one aspect of the invention, the end fitting may comprise an external wall partially in contact with the internal wall of the spraying device. The spraying device is thus held mechanically on the end fitting by virtue of contact between a part of the external wall of the end fitting and the internal wall of the spraying device.

In this assembly, the end fitting extends in a third longitudinal direction, the shape of the end fitting in the region of a cross section in a plane transverse to the third longitudinal direction, carried out perpendicularly to the spraying device, being complementary to the shape of the housing in the region of a cross section in a plane transverse to the third longitudinal direction. The third longitudinal direction is, in particular, parallel to the first longitudinal direction and to the second longitudinal direction.

According to one exemplary embodiment of the invention, the end fitting comprises a first opening extending in a plane transverse to the third longitudinal direction and able to receive the wiper, the spraying device being located on the side of said first opening in the end fitting. The first opening in the end fitting extends, for example, in a plane perpendicular to the third longitudinal direction.

In this example, the end fitting comprises at least one notch receiving the fastening means of the device.

Advantageously, the end fitting comprises a second opening intended to be fitted at least partially on the wiper and extending in a plane transverse to the first opening in the end fitting, said second opening being bordered by a first flank and a second flank, at least one of the notches, called the first notch, being located in the region of the first flank and at least one of the notches, called the second notch, being located in the region of the second flank. In this way, once the assembly has been put together, the first notch receives the first lug and the second notch receives the second lug.

The invention also relates to a wiper comprising at least one support, a vertebra, a wiper blade, an end fitting mounted on a longitudinal end of the wiper and a spraying device as described above and installed on said end fitting.

Thus, by virtue of the invention, it is possible to position a spraying device on an end fitting of the wiper in a simple and reliable manner. Specifically, the spraying device is threaded onto the end fitting by making use of the complementary profile of the internal wall of the spraying device and of the external wall of the end fitting. The spraying device may be threaded on in a direction parallel and/or perpendicular to the first longitudinal direction, the body of the device tending to open in order to let the end fitting pass and then to close as soon as the fastening means is in position on the notch or notches of the end fitting. This is a technical solution which is simple to implement, is reliable and meets the economic constraints that exist in the automotive sector.

Further features, details and advantages of the invention will become more clearly apparent from reading the description given hereinbelow by way of illustration and with reference to the drawings, in which.

It should be noted that the figures disclose the invention in a detailed manner so as to implement the invention, and said figures may of course serve to define the invention more clearly, where necessary.

Figure 1:
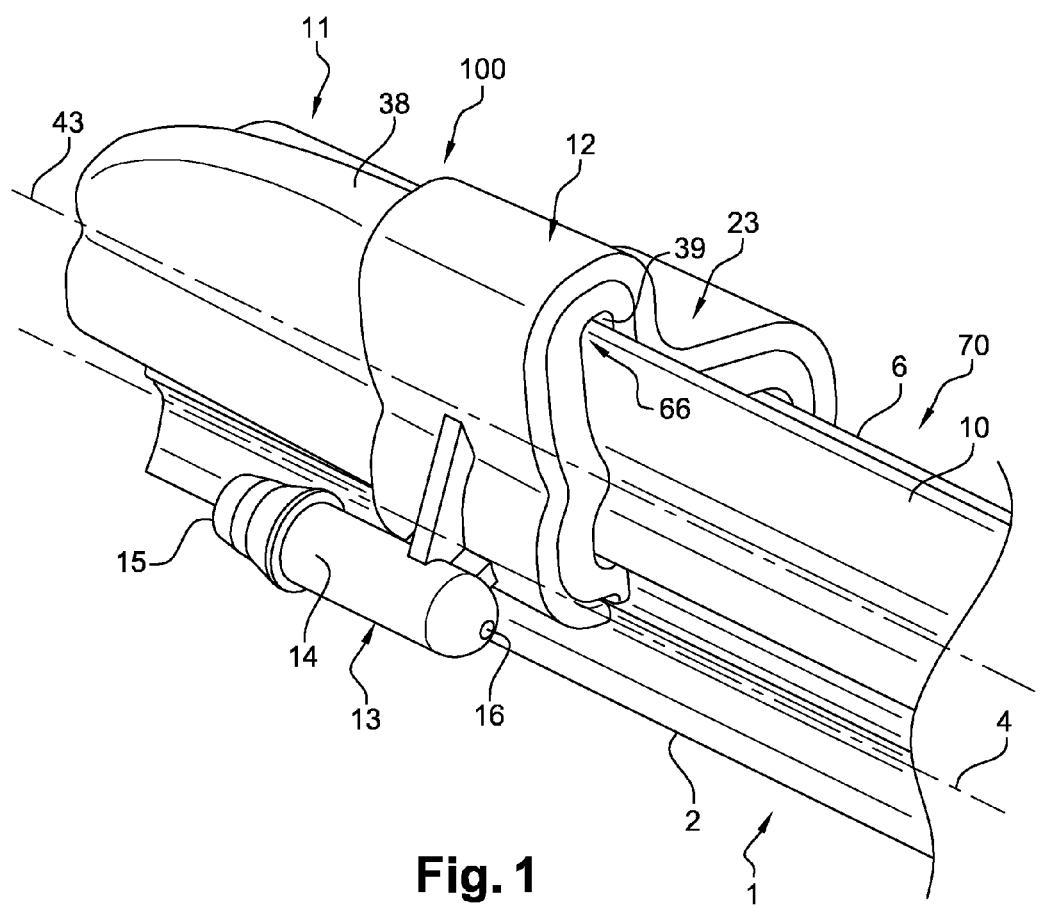
FIG. 1 is a perspective view of one end of a wiper equipped with an exemplary embodiment of a spraying device according to the invention.

FIG. 1 shows in a partial manner a wiper 70 with which a wiping system mounted on a motor vehicle is provided. This wiper 70 is installed on the front windshield of the vehicle but it may also be mounted on the rear window of the latter.

The wiper comprises a wiper blade 1, also known as a squeegee blade, consisting of a zone 2 for rubbing on the window, said zone being connected to a heel by a thinned portion. This heel provides the mechanical connection to a constituent support of the wiper. This wiper blade 1 extends lengthwise along a longitudinal axis 4.

The wiper 70 furthermore comprises a vertebra (visible in FIG. 2) which forms a stiffening device of the wiper 70. By way of example, this is a single metal strip which extends along the longitudinal axis 4, thus defining its length, and which has at rest a convex curvature with respect to the windshield. This strip has a predetermined flexibility, which, by deforming when the wiper is pressed against the windshield, brings about a force distributed along the entire length of the wiper blade 1.

The blade 1 and the vertebra are held by the support 6 which thus forms a longitudinal supporting frame covering and retaining the vertebra and the wiper blade 1. This support 6 thus provides a mechanical connection between the blade 1 and the vertebra. It furthermore comprises an air deflector 10, the function of which is to increase the pressing force of the wiper blade 70 on the windshield to the benefit of the aerodynamic effect of the air. In this exemplary embodiment, the air deflector 10 and the support 6 form a common assembly. They are for example molded from one and the same flexible material such as rubber or an elastomer.

At the end of the wiper there is installed an end fitting 11. In a general manner, this end fitting 11 carries out a multiplicity of functions:
  it is involved in the mechanical retention of the wiper 70;
  it allows the wiper blade 1 to be mounted on and removed from the support 6, it being possible for the latter to be replaced by translation of the blade with respect to the support 6;
  it provides an esthetic finish for the end of the wiper;
  it serves as a support for receiving the spraying device 12.

The end fitting 11 has a section generally complementary to the section of the support 6 and of the deflector 10. This end fitting comprises an internal wall 39 and an external wall 38 which follows the profile of the support 6 and of the deflector 10.

FIG. 1 also shows an exemplary embodiment of the device 12 for spraying a windshield washer liquid according to the invention. Such a device is intended to be mounted on the end fitting 11 and supplies a quantity of liquid onto the glazed surface so as to promote the cleaning of the latter by the scraping action of the wiper.

Such a spraying device 12 comprises at least one body 23 and a circulation channel 13 for the liquid that are produced in one piece. It will be understood here that this channel 13 and this body 23 are molded simultaneously from one plastics material. They thus form an assembly which is inseparable without destroying one or the other of these elements.

The channel 13 is in the form of a hollow and cylindrical tube 14 which comprises, at a first longitudinal end, a liquid intake orifice 15 and, at a second end opposite the first end with respect to the tube 14, a spraying orifice 16.

Figure 2:
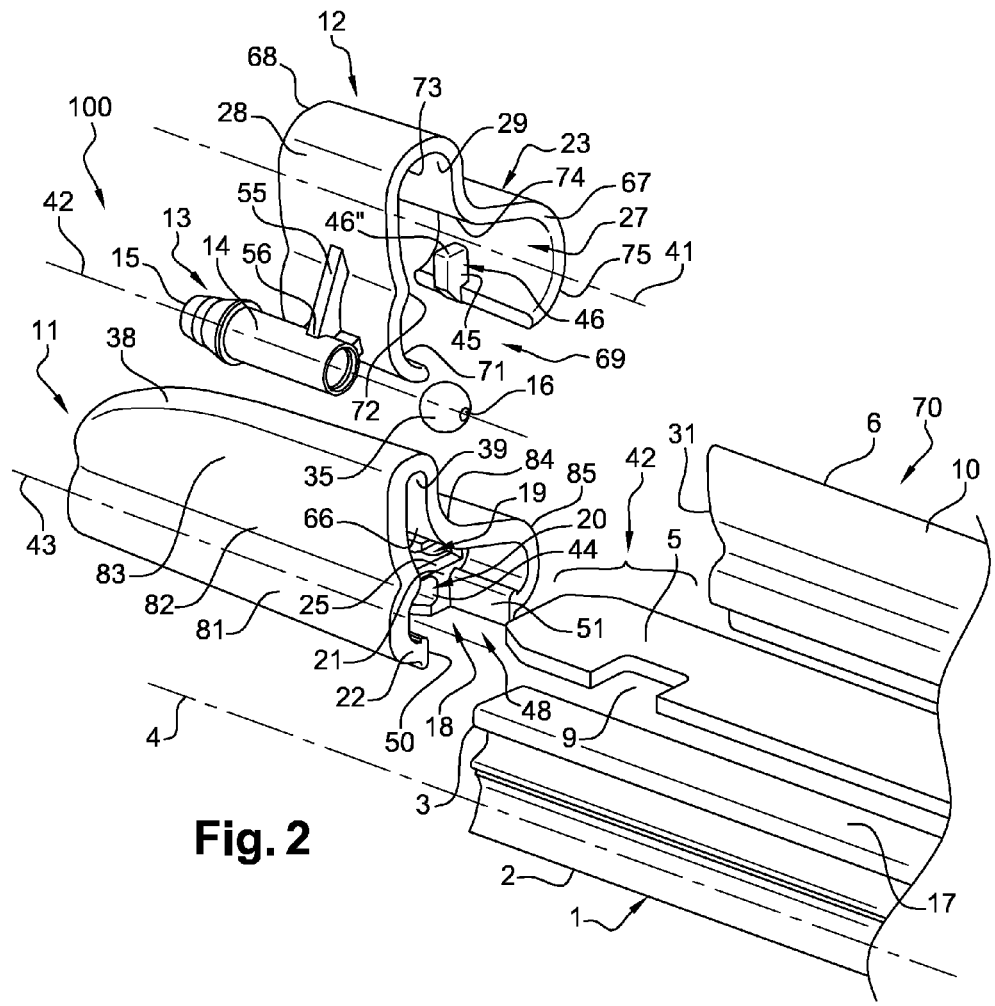
FIG. 2 is an exploded view of FIG. 1, showing a variant embodiment of the spraying device.

FIG. 2 shows in more detail the structure of the constituent elements of the wiper according to the invention.

The wiper blade 1 comprises its rubbing zone 2 and its heel 3 delimited by an upper wall 17. The vertebra is in this case provided with the reference 5 and it can be seen that the latter comprises a cutout 9 provided on one side of the vertebra. Such a cutout is involved in securing the end fitting 11 to the wiper.

The end fitting 11 is able to be attached to a longitudinal end of the wiper 70 and has longitudinal extension dimension parallel to the longitudinal axis 4, that is to say it extends in a longitudinal direction, called the third longitudinal direction 43, parallel to the direction defined by the longitudinal axis 4. The end fitting 11 is delimited with respect to the outside by the outer wall 38. It also comprises the internal wall 39, opposite the external wall 38, which at least partially delimits a volume or space in which a first cavity 19 and a second cavity 20 extend.

The first cavity 19 is able to receive the vertebra 5 while the second cavity 20 is able to receive the wiper blade 1, more specifically the heel 3 of the blade.

The first cavity 19 is formed in the constituent plastics material of the end fitting 11. This first cavity 19 corresponds to a removal of material having a section complementary to the section of the vertebra 5. Such a first cavity 19 extends in a direction parallel to the third longitudinal direction 43. This first cavity 19 is thus delimited on one side by a constituent upper face of the end fitting 11 and on the other side by an intermediate wall 25. Laterally, this first cavity 19 is bordered by two portions of the internal wall 39 of the end fitting 11.

The second cavity 20 receives the heel 3 of the wiper blade 1. This second cavity 20 extends longitudinally in the end fitting 11 in a direction parallel to the third longitudinal direction 43. Such a second cavity 20 is opposite the first cavity 19 with respect to the intermediate wall 25. It will be understood that the latter delimits both the first cavity 19 and the second cavity 20. The end fitting 11 also comprises a cutout aligned with the second cavity 20, said cutout opening the latter toward the surroundings of the end fitting 11. Such a cutout has a width less than the width of the second cavity 20 measured along a transverse axis perpendicular to the longitudinal axis 4 and allows the thinned portion located between the heel 3 and the rubbing zone 2 to pass through.

The cavity 20 is bordered laterally by two lateral edges called the first lateral edge 44 and the second lateral edge (not shown). The first lateral edge 44 is connected to the internal wall 39 and external wall 38 of the end fitting 11 by way of a first flank 50 and, in the same way, the second lateral edge is connected to the internal wall 39 and external wall 38 of the end fitting 11 by way of a second flank 51. The first flank 50 and the second flank 51 extend, for example, in two mutually parallel planes parallel to the third longitudinal direction 43. Thus, the cavity 20 extends between the first flank 50 and the second flank 51.

It will be noted that the end fitting 11 comprises a face 21 into which the first cavity 19 and the second cavity 20 open. This face 21 extends in a plane perpendicular to the longitudinal axis 4 and this face 21 is formed in a manner set back from an edge 22 which terminates the end fitting 11. This face 21 is parallel to a first opening 66 in the end fitting 11, the wiper blade 70 being threaded on via said first opening 66. This first opening 66 in the end fitting 11 extends, for example, in a plane transverse to the third longitudinal direction and in particular in a plane perpendicular to the third longitudinal direction.

Thus, the external wall 38, the internal wall 39, the first flank 50 and the second flank 51 are extended beyond the face 21 so as to form an internal space 18. Such an internal space 18 thus receives the support 6 and advantageously the air deflector 10 of the wiper. In other words, the internal wall 39 overlaps the support 6, thereby making it possible to hide any unsightly burrs that result from cutting the support 6. The face 21 and an extreme edge surface 31 of the support 6 form two end stops which come into abutment against one another when the end fitting 11 is threaded onto the support 6.

The opening present between the first flank 50 and the second flank 51 is called the second opening 48 in the end fitting 11. This second opening 48 in the end fitting 11 is thus bordered by the first flank 50 and the second flank 51 and is intended to be fitted at least partially on the wiper. It extends in a plane transverse, in particular perpendicular, to the plane in which the first opening 66 in the end fitting 11 extends.

FIG. 2 also shows in detail the structure of the device for spraying a liquid according to the invention. Such a spraying device extends in a longitudinal direction parallel to the longitudinal axis 4 and called the first longitudinal direction 41.

According to the invention, the body 23 of the spraying device 12 comprises an internal wall 29 which delimits a housing 27 intended to receive or cover the end fitting 11. The body 23 also comprises an external wall 28 which delimits it with respect to the outside.

The housing 27 comprises three openings which extend respectively through a first side 67 bordering the body 23, through a second side 68 bordering the body 23 and separate from the first side 67, and through a third side 69 connecting the first side 67 to the second side 68 such that the housing 27 is able to be fitted on the end fitting 11. The first side 67 bordering the body 23 extends in a plane transverse to the first longitudinal direction 41 and in particular in a plane perpendicular to the first longitudinal direction 41. The second side 68 bordering the body 23 also extends in a plane transverse to the first longitudinal direction 41 and for example in a plane perpendicular to the first longitudinal direction 41 such that it is opposite the first side 67 bordering the body 23 with respect to the housing 27. The third side 69 extends in a plane transverse to the planes in which the first and second side 67, 68, bordering the body 23, extend, and in particular in a plane perpendicular to the planes in which the first and second side 67, 68, bordering the body 23, extend.

The opening extending in a plane in which the first side 67 bordering the body 23 extends and located on the side of the center of the wiper 70 is called the first opening in the housing 27. The opening extending in the plane in which the second side 68 bordering the body 23 extends and located on the side of the end of the wiper 70 is called the second opening in the housing 27. The opening extending in the plane in which the third side 69 connecting the first side to the second side extends is called the third opening in the housing 27.

Thus, the housing 27 forms a hole which passes right through the spraying device 12 in the first longitudinal direction 41 in order that the spraying device 12 can be fitted on the end fitting 11. Such a housing thus ensures the mechanical retention of the spraying device 12 with respect to the end fitting 11.

The internal wall 29 of the body 23 of the spraying device 12 comprises, when viewed from the inside and as illustrated in FIG. 2, a first face 71 having a concave shape connected to a second face 72 having a convex shape, itself connected to a third face 73 having a concave shape, connected in turn to a fourth face 74 having a convex shape, connected finally to a fifth face 75 having a concave shape. The faces 71, 72, 73, 74, 75 are thus able to match the contour of the external wall 38 of the end fitting 11, that is to say that the faces of the internal wall 29 of the spraying device 12 are intended to cover the external wall 38 of the end fitting 11 in order to ensure the mechanical retention of the spraying device 12 on the end fitting 11.

To this end, the external wall 38 of the end fitting 11 comprises in particular a first face 81 having a convex shape connected to a second face 82 having a concave shape, itself connected to a third face 83 having a convex shape, connected in turn to a fourth face 84 having a concave shape, connected finally to a fifth face 85 having a convex shape. The first, second, third, fourth and fifth faces of the external wall 38 of the end fitting 11 can thus receive and be in contact with the first, second, third, fourth and fifth faces, respectively, of the internal wall 29 of the spraying device 12.

As shown in FIG. 2, the spraying device according to the invention may comprise at least one fastening means 45 able to immobilize the spraying device with respect to the end fitting 11 in a direction parallel to the first longitudinal direction 41. In this way, the spraying device 12 is immobilized on the end fitting 11 in all spatial directions by virtue of its internal wall 29 and its fastening means 45.

The fastening means comprises, for example, at least one lug 46 and, in particular, two lugs 46. The lug or lugs 46 is/are in the form of protuberances which originate in the region of the internal wall 29 of the body 23 of the spraying device 12. The lug or lugs 46 extend in particular toward the interior of the housing 27, that is to say toward an interior volume of the body 23, delimited by the internal wall 29 of the body 23.

In one exemplary embodiment, at least one of the lugs, called the first lug (having the reference 46' in FIG. 4), originates in the region of the concave first face 71 of the internal wall 29 of the body 23 and at least one of the lugs, called the second lug 46", originates in the region of the concave fifth face 75 of the internal wall 29 of the body 23.

FIG. 2 also illustrates an exemplary embodiment of the spraying orifice 16. The tube 14 is thus open so as to receive a ball 35 that is perforated by a hole in its center. The latter is then attached to an open end of the channel 13, in particular fitted into the tube 14, so as to be able to move in rotation and to be fixed in translation in order that the spraying of liquid can be adjusted to the desires of the vehicle user.

The channel 13 also extends in a longitudinal direction parallel to the longitudinal axis 4, called the second longitudinal direction 42. In this exemplary embodiment of the invention, the second longitudinal direction 42 is parallel to the first longitudinal direction 41. Such a disposition favors the efficacy of cleaning the wiped window, since it allows the windshield washer liquid to be sprayed as close as possible to the wiper blade.

The liquid circulation channel 13, the body 23, the lug or lugs 46 form a single piece, that is to say one produced simultaneously from one and the same material, for example a plastics material.

The liquid circulation channel 13 is thus mechanically connected to the body 23 via at least one arm 55, also known as a strut. This arm 55 originates on one side on the external wall 28 of the body of the spraying device 12 and on the other side on the tube 14. In a complementary manner, such a connection is completed by an extension 56 of the external wall 28 of the body 23 of the spraying device 12 in the direction of the tube 14. In such a situation, the arm 55 extends in a plane perpendicular to the extension 56.

Figure 3:
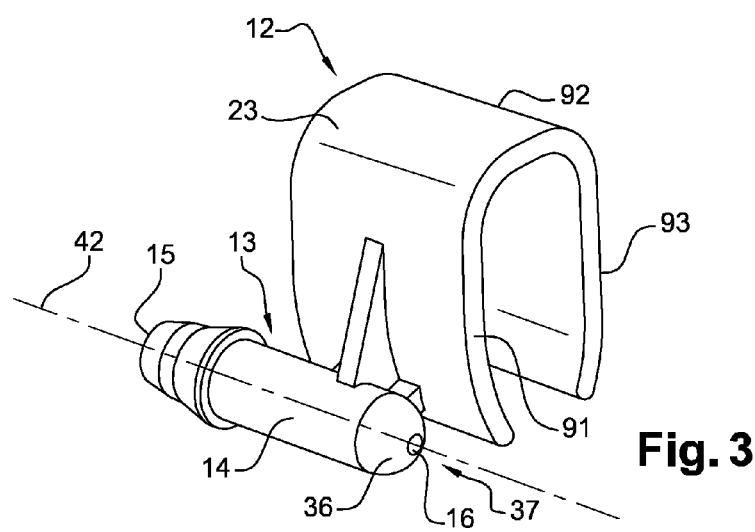
FIG. 3 is a perspective view of the spraying device according to a variant embodiment.

FIG. 3 shows a variant embodiment of the invention according to which the body 23 of the spraying device 12 comprises a first portion 91 connected to a second portion 92 connected in turn to a third portion 93. The first, second and third portions of the body 23 extend in particular in different planes, the first portion 91 being in particular opposite the third portion 93 and the second portion 92 being for example opposite the third opening in the housing 27.

Thus, if the end fitting had an external wall having a different shape from that illustrated in FIG. 2, for example an external wall having three portions extending in different planes, the spraying device according to the variant embodiment shown in FIG. 3 would be able to be fitted on the end fitting. In other words, the first portion 91, the second portion 92 and the third portion 93 are able to match the contour of the external wall 38 of the end fitting 11.

FIG. 3 also shows another exemplary embodiment of the spraying orifice 16. The tube 14 is closed at its second end by a surface 36, for example a spherical surface, molded simultaneously together with the formation of the liquid circulation channel 13. This spherical surface 36 has a hole 37 which extends along a central axis coincident with the second longitudinal direction 42, this hole 37 spraying the liquid onto the window to be wiped. The spraying orifice 16 is thus in this case in the form of a hole 37 made in the surface 36 molded together with the liquid circulation channel 13.

Figure 4:
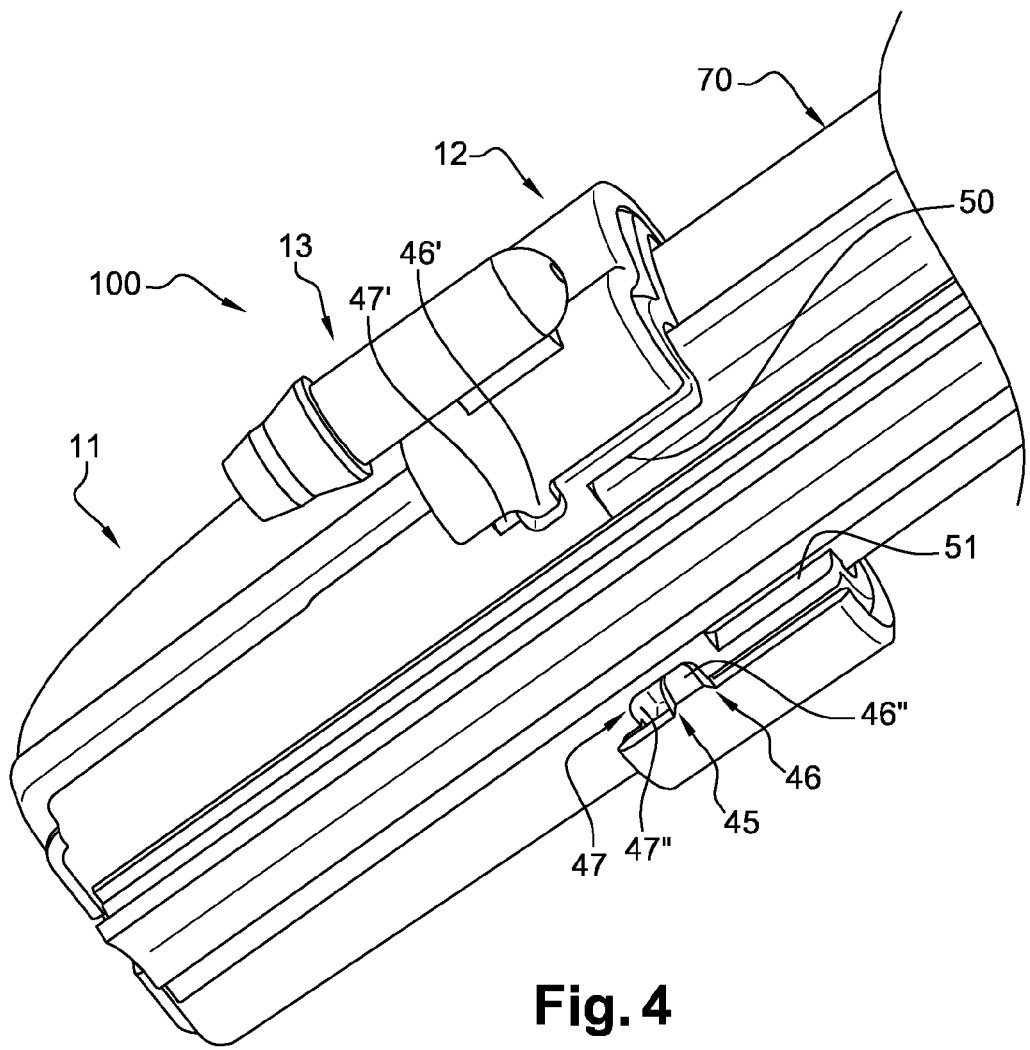
FIG. 4 shows a bottom view of the spraying device illustrated in FIG. 1.

The invention also relates to an assembly 100 illustrated in FIGS. 1, 2 and 4, comprising the end fitting 11, able to be installed at a longitudinal end of the wiper 70, and the spraying device 12. In this assembly 100, the external wall 38 of the end fitting 11 is partially in contact with the internal wall 29 of the body 23 of the spraying device 12 so as to retain the spraying device 12 on the end fitting 11.

As is shown in FIG. 1, the shape of the end fitting 11 in the region of a cross section through the end fitting 11 in a plane transverse to the third longitudinal direction 43, carried out perpendicularly to the spraying device 12, is complementary to the shape of the housing 27 in the region of a cross section through the housing 27 in a plane transverse to the third longitudinal direction. It will be understood here that the profile of the external wall 38 of the end fitting 11 is complementary, along a cross section carried out in a plane perpendicular to the third longitudinal direction, to the profile of the internal wall 29 of the body 23 of the spraying device 12. In other words, the housing 27 has a section complementary to the section of the end fitting 11 in a plane perpendicular to the third longitudinal direction 43.

FIG. 1 also illustrates an aspect of the invention according to which the spraying device 12 is located on the side of the first opening 66 in the end fitting 11. In other words, the spraying device 12 is located closer to the side of the end fitting 11 that is directed toward the center of the wiper 17 than to the end of the end fitting 11. The first opening 66 in the end fitting 11 thus extends in the same plane as the first opening in the housing 27 of the spraying device 12.

FIG. 4 shows another aspect of the invention according to which the end fitting 11 comprises at least one notch 47 receiving the fastening means 45 of the device 12.

Advantageously, at least one of the notches 47, called the first notch 47', is located in the region of the first flank 50 and at least one of the notches, called the second notch 47", is located in the region of the second flank 51. In this way, the first lug 46' of the spraying device 12 is inserted into the first notch 47' located in the region of the first flank 50 and the second lug 46" of the spraying device 12 is inserted into the second notch 47" located in the region of the second flank 51. The shape complementarity between the lugs 46 and the notches 47 thus ensures that the spraying device 12 is fastened to the end fitting 11.

The invention also relates to a wiper 70 comprising at least the support 6, the vertebra 5, the wiper blade 1, the end fitting 11 and the spraying device 12 as described above.

In this wiper 70, and is shown in FIG. 2, the support 6 is offset with respect to the vertebra 5 along the longitudinal axis 4. Such an offset thus frees a zone 42 which is intended to receive the end fitting 11. The presence of such a zone 42 makes the combination of the support 6 with the vertebra 5 and the wiper blade 1 distinctive for use with the end fitting 11. In other words, this combination is distinctive when the support 6 is shorter, along the longitudinal axis 4, compared with the length of the vertebra 5, and possibly the length of the wiper blade 1.

According to one exemplary embodiment of the wiper 70, the support 6 has a dimension along the longitudinal axis 4, that is to say a length, of the wiper that is less than a dimension of the vertebra 5 measured along this same axis. Such a disposition thus makes it easily possible to form the zone 42, for example by cutting the support 6 to a length less than the vertebra 5.

It is also possible to extract and/or to insert the wiper blade 1 by translation along the longitudinal axis 4 with respect to the support 6. The end fitting 11 may thus have removable fastening means on the wiper so as to enable the extraction or insertion of the wiper blade, and at the same time to secure the position of the wiper blade after it has been replaced. In the event that the wiper blade is worn, it is thus possible to replace only the latter and to keep the other components such as the support 6, the deflector 10, the vertebra 5, the spraying device 12 or the end fitting 11, since the service life of these components is greater than that of the wiper blade 1.

FIG. 2 also illustrates a method for assembling the spraying device 12 on a wiper 70 having a reception zone 42, where, the spraying device 12 is fitted onto the end fitting 11;
the end fitting 11 is fitted onto the wiper by sliding a constituent vertebra 5 of the wiper into a first cavity 19 made in the end fitting 11.

Alternatively, it is possible first of all to fit the end fitting 11 on the wiper 70, as explained in the preceding paragraph, and then to fit the spraying device 12 on the end fitting 11.

The invention claimed is:

1. A device for spraying a liquid comprising:
a body and a circulation channel for the liquid that are produced in one piece, said channel comprising an inlet orifice and a spraying orifice, wherein the body comprises an internal wall which delimits a housing intended to encompass an external wall of an end fitting,
wherein the device is mounted on the end fitting able to be attached to a longitudinal end of a wiper,
wherein the device extends in a first longitudinal direction; and
a means for fastening the spraying device to immobilize the spraying device with respect to the end fitting in a direction parallel to the first longitudinal direction.

2. The device as claimed in claim 1, wherein the housing comprises three openings which extend respectively through a first side bordering the body, through a second side bordering the body and separate from the first side, and through a third side connecting the first side to the second side such that the housing is able to be fitted on the end fitting.

3. The device as claimed in claim 1, wherein the body comprises a first portion connected to a second portion connected in turn to a third portion, said first, second, and third portions of said body extending in different planes and being able to match the contour of the external wall of the end fitting.

4. The device as claimed in claim 1, wherein the internal wall of the body comprises a first face having a concave shape connected to a second face having a convex shape, the second face connected to a third face having a concave shape, connected in turn to a fourth face having a convex shape, connected finally to a fifth face having a concave shape, said faces being able to match the contour of an external wall of the end fitting.

5. The device as claimed in claim 1, wherein the liquid circulation channel extends in a second longitudinal direction, the second longitudinal direction being parallel to the first longitudinal direction.

6. The device as claimed in claim 1, wherein a first lug originates in the region of the concave first face of the internal wall of the body and a second lug originates in the region of the concave fifth face of the internal wall of the body.

7. The device as claimed in claim 1, wherein the liquid circulation channel is connected to the body by at least one arm which originates on an external wall of the body.

8. An assembly comprising:
an end fitting able to be installed at a longitudinal end of a wiper; and
a device for spraying a liquid for a wiper comprising
a body and a circulation channel for the liquid that are produced in one piece, said channel comprising an inlet orifice and a spraying orifice, wherein the body comprises an internal wall which delimits a housing intended to encompass an external wall of the end fitting,
wherein the device is mounted on the end fitting and extends in a first longitudinal direction; and
a means for fastening the spraying device to immobilize the spraying device with respect to the end fitting in a direction parallel to the first longitudinal direction.

9. The assembly as claimed in claim 8, wherein the end fitting comprises the external wall partially in contact with an internal wall of the spraying device.

10. The assembly as claimed in claim 8, wherein the end fitting extends in a third longitudinal direction and wherein the shape of the end fitting in the region of a cross section in a plane transverse to the third longitudinal direction, carried out perpendicularly to the spraying device, is complementary to the shape of the housing in the region of a cross section in the plane transverse to the third longitudinal direction.

11. The assembly as claimed in claim 10, wherein the end fitting comprises a first opening extending in the plane transverse to the third longitudinal direction and able to receive the wiper, the spraying device being located on the side of said first opening in the end fitting.

12. The assembly as claimed in claim 11, wherein the end fitting comprises a second opening intended to be fitted at least partially on the wiper and extending in a plane transverse to the plane in which the first opening in the end fitting extends, said second opening being bordered by a first flank and a second flank, a first notch, being located in the region of the first flank and a second notch, being located in the region of the second flank.

13. The assembly as claimed in claim 8, wherein the end fitting comprises a first cavity and a second cavity which are separated by an intermediate wall and are able to respectively receive a vertebra and a wiper blade of the wiper.

14. A wiper comprising:
- at least one support;
- a vertebra;
- a wiper blade; and
- a spraying device as claimed in claim 1, installed on a longitudinal end of the wiper.

* * * * *